Oct. 26, 1926.
F. T. BAIRD
1,604,872
MULTICELL BATTERY
Filed Oct. 10, 1923      2 Sheets-Sheet 1
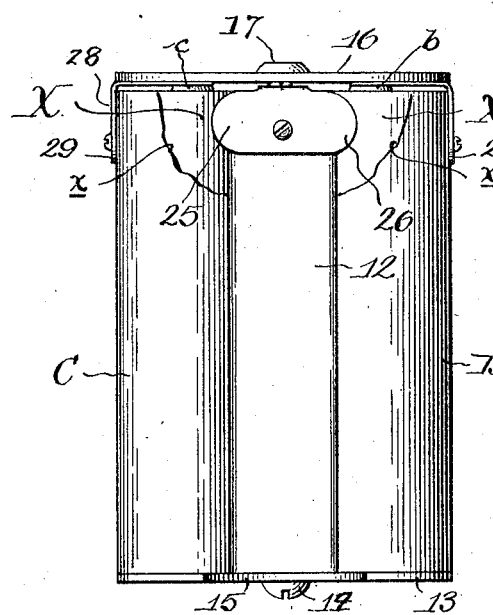
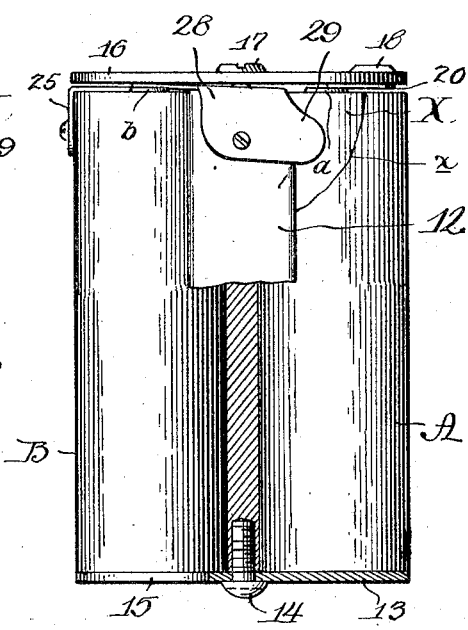
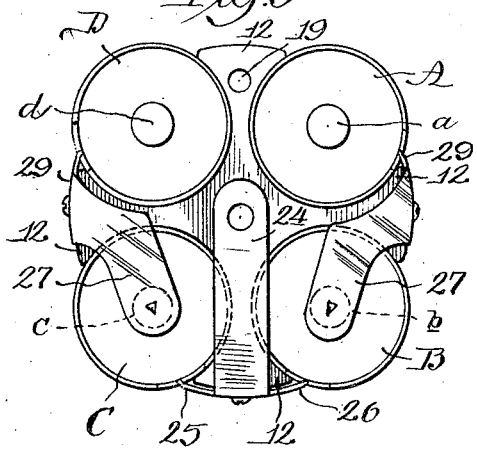
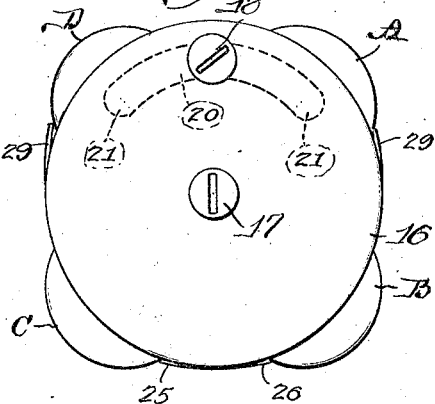
Witness:
Chas. R. Koursh
Inventor,
Frank T. Baird,
By Benjamin, Rooshew & Lundy Attys Oct. 26, 1926.  
F. T. BAIRD  
MULTICELL BATTERY  
Filed Oct. 10, 1923    2 Sheets-Sheet 2  
1,604,872
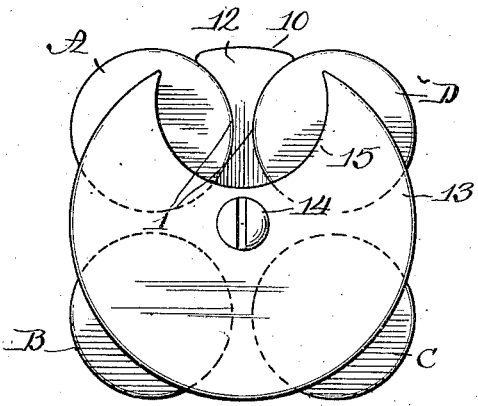
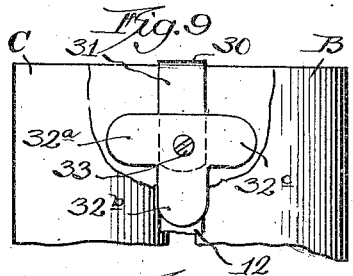
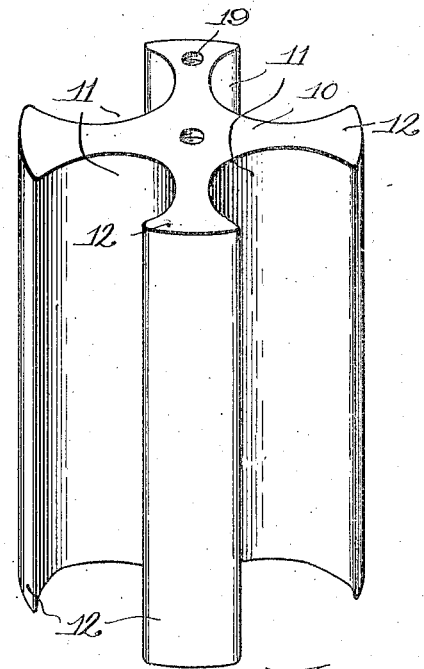
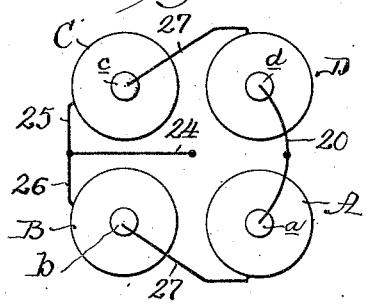
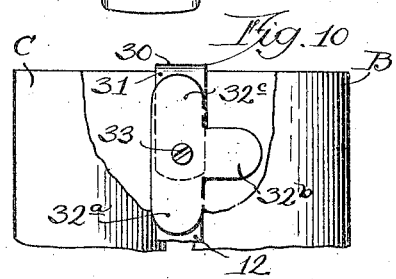
Witness:
Chas. R. Foursh.
Inventor,
Frank T. Baird.
By Benjamin, Roadhouse & Lum Attys.

Patented Oct. 26, 1926.

1,604,872

UNITED STATES PATENT OFFICE.

FRANK T. BAIRD, OF BLUE ISLAND, ILLINOIS.

MULTICELL BATTERY.

Application filed October 10, 1923. Serial No. 667,724.

My invention relates to a battery and more particularly to a structure wherein a plurality of cells may be utilized and certain of cells employed in the series, or all the cells may be utilized at the same time.

The objects of my invention reside in providing a structure of this character whereby one series of cells may be switched into circuit and utilized for a certain period, then another series switched into circuit and used until that series of cells becomes weaker, and thereafter the entire set of cells may be thrown into circuit and employed until all of the cells have been worn out. Thus the unit will be capable of use for a longer period of time than would ordinarily be possible where several cells were employed until their energy has been used up. Another object is to provide a unit of this type that will afford facilities for retaining a plurality of the cells in an extremely compact form so that the unit may be employed in the battery container of an electric lantern. Other objects reside in providing a structure of this character wherein the facilities for shifting the circuits from one set of battery cells to another or to all the cells is very simple and may be readily manipulated by unskilled persons. Further objects reside in providing a multi-cell battery unit which is simple in structure, easy to operate, inexpensive to manufacture, and dependable in its operation.

I prefer to carry out my invention and accomplish the aforesaid objects in substantially the manner hereinafter described, and as more particularly pointed out in the claims. Reference will now be made to the accompanying drawings that illustrate a typical or preferred embodiment and which form a part of this specification.

In the drawings:

Figure 1 is a vertical elevation of my multi-cell battery.

Fig. 2 is a vertical elevation partly in section, showing the side at the right hand of the structure illustrated in Figure 1.

Fig. 3 is a top plan of my invention with the cover plate removed.

Fig. 4 is a view similar to Figure 3 showing the cover plate in position.

Fig. 5 is a bottom plan of the structure shown in Figure 1.

Fig. 6 is a perspective of the body of the retainer or holder for the cells.

Figure 7 is an inverted perspective of the cover plate detached from the unit.

Fig. 8 is a schematic view of the circuits.

Fig. 9 is a fragmental view of a modified structure.

Fig. 10 shows the modified structure in a changed position.

Referring to Figure 6 it will be observed the retainer or holder for the cells comprises a body 10, preferably of cylindrical exterior outline and provided with a plurality of (preferably four) concave pockets or recesses 11. These pockets 11 are of segmental outline in cross section and are arranged radially from the center of the body 10 so that there are interposed between the same a corresponding number of dividing walls 12 which afford means for insulating and spacing the individual battery cells. As seen in Figures 3 and 5 the battery cells A, B, C and D are of the small commercial dry-cell type and the pockets 11 are so formed that the cells will snugly fit into the same and may be inserted into the same from one end of the body 10 while the walls 12 at their outer ends are flared outwardly and extend towards each other so that the pockets will envelop more than half of their respective cells. For the purpose of maintaining the cells in position I have provided upon the bottom of the body a rotatable disk 13 that is substantially of the same diameter as the body 10 and I rotatably mount this disk upon a centrally disposed screw 14 that is tapped into the central portion of the body 10. A concave recess 15 is formed in the disk, extending inwardly from an edge thereof, which recess is of sufficient dimensions to permit the passage therethrough of a battery cell when the disk has been rotated to a position in which the recess is in registry with the desired pocket 11 in the body. After the battery cell has been inserted the disk is rotated to a position with the recess out of registry with a pocket as shown in Figure 5 where it overlaps the bottoms of the adjacent battery cells and maintains all of the cells within their respective pockets.

Mounted upon the top of the body 10 is a cover plate 16, of circular outline which has a diameter corresponding to the dimensions of the body 10, which cover plate 16 is secured in position by a central screw 17 and a second screw 18 disposed adjacent the outer edge of the cover plate. This central screw 17 extends down into the axis of the body 10 and provides the central terminal for the battery unit. The screw 18 enters one of the walls 12 into a threaded aperture 19 made therein, (Figure 3) and provides the other terminal of the circuit.

Secured to the under-side of this cover plate 16 and having electrical connection with the outer screw terminal 18 is a segmental shaped bridge plate 20, the opposite ends thereof being offset slightly from the plane of the body of the plate to provide yielding arms 21 and said bridge plate is secured to the cover plate by means of rivets 22 or the like. This bridge is so disposed that its ends will bear upon the central terminals or cores a and d of the adjacent battery cells A and D. As seen in Figure 7 the arms of this segmental bridge are each provided with substantially V-shaped tangs 23 that are formed by punching out converging slots in the metal of which the element is formed and bending the intermediate portions outwardly from the body to provide these pointed tangs 23. The points of these tangs will have a tendency to cut into the metal of the cell cores, and this insures positive electrical contact with the central poles of the cells.

Secured to the top of the body 10 by the central terminal screw 17 is a substantial T-shaped contact plate, the stem 24 or elongated portion of the T being disposed over and upon the top of the block or upper end of the wall 12 and is secured in position thereon by the central screw 17. The plate is bent at right angles downwardly at the juncture of the stem with the arms of the T so as to provide oppositely disposed wings 25 and 26 that lie over and against the outer curved surface of wall 12 upon which it is mounted, and the distance from end to end of these arms is greater than the transverse width of this outer surface of the wall 12. This contact element formed of the member 24—25—26 is positioned adjacent to and between the cells B and C so that the arms 25 and 26 will be yieldingly in contact with the exterior cylindrical wall of these cells. Prior to the insertion of the cells into the holder or body a portion of the insulation covering thereof, (usually paper board or the like), is removed as seen at x in Figure 1 and the ends of the arms 25 and 26 will thus be in contact with the negative element of these cells which is usually in the form of a zinc cylinder X.

Upon the exterior of the remaining walls 12 of the body which are intermediate of the walls carrying the contacts heretofore described, are connectors in the form of irregularly shaped plates that have yielding extensions 27 that are disposed upon the end of the retainer body 10 and project from the respective walls 12 over the ends of the cells B and C and into contact with the central terminals or poles b and c thereof. The remaining portions of these connectors comprise a lateral element 28 that is bent downwardly to fit against the adjacent portions of the walls 12 and have extensions 29 that project beyond the side edges of the walls so as to contact with the cells that are positioned in the adjacent pockets. The cells B and C have the insulating cover removed or torn away at x in a manner similar to the other cells so that the extensions 29 may be brought into contact with the zinc casing X thereof to form an electrical connection.

It is preferable to utilize the cells in single pairs or to use two pairs. For example, the cells A and B may be utilized and the cells C and D thrown out of electrical operation. This is done by rotating the bottom retaining plate or disk 13 until the aperture 15 is below or in registry with the cell C. The cell C is then axially rotated or entirely withdrawn and inserted into this respective pocket 11 with the insulating cover in contact with the arm 25 of the T-shaped conductor member 24—25—26. In this position of the respective parts the cells A and B are the only ones that are functioning. When their electrical energy has been exhausted to a point where they will not cause sufficient illumination of the bulb in the lantern, the cell B is rotated until the insulating cover contacts the arms 26 of the T-shaped conductor and the cell C is rotated to bring the zinc cylindrical casing into contact with the arm 25 of the T-shaped conductor. This throws out of circuit the cells A and B and switches into circuit the cells C and D which may be operated until their electrical energy has been reduced to a point that is not desired. Thereafter the full force of the four cells may now be brought into service by rotating the cell B until its zinc cylindrical casing contacts the arm 26 of the T-shaped conductor at which time all of the four cells will be in circuit.

In the event it is not desired to rotate the battery cells for the purpose of throwing into or out of circuit one or the other, or both, pairs of cells; I provide the structure shown in Figs. 9 and 10 wherein the connector 30 is formed L-shaped with the lateral arm 31 extended down upon the side of the body, and pivotally mounted upon the lower portion of this arm 31 is a tridentate element comprising oppositely extending alining members $32^a$ and $32^c$ and an intermediate member $32^b$ that is laterally disposed with respect to the other two members and all radiating from a common center. A pivotal element 33 such as a screw, rivet or the like movably secures the tridentate element to the arm of the conductor 30 so that the same may be rotated thereon to positions in which the intermediate member 32$^b$ is contacting with the cell B or C, or when moved to the position shown in Fig. 10 with the alining arms horizontal both the cells B and C are in service. This requires little or no manipulation on the part of the user and in many instances may be found extremely desirable.

By this structure it will be seen that I have provided a simple battery unit employing multiple cells having a greater longevity than should all four cells be employed at the same time under full load. It will also be seen the structure is extremely compact and is simple to operate and may be readily inserted into the usually constricted battery container of a hand lantern.

What I claim as new is:—

1. A multi-cell battery structure comprising a body having a plurality of pockets, cells positioned in said pockets, a plate extending over said cells and body, terminals on said plate, a connector leading from one of said terminals to the negative sides of a pair of cells, separate connectors leading from the positive poles of each cell of said pair to the negative sides respectively of a second pair of cells, a third connector leading from the other terminal to the positive poles of said second pair of cells, and a retaining plate rotatably secured to the bottom of said body and provided with an opening adapted to be brought into registry with respective cells whereby the latter may be moved in and out of its pocket.

2. In a multi-cell battery a cell retainer having a plurality of undercut cell receiving grooves arranged about a common center, a plate secured to one end of said retainer and closing said grooves at said end, a centrally and a laterally disposed terminal on said plate, each having electric connection with a pair of cell terminals of the same sign, conductors making series connection between adjacent cells of different pairs, and a second plate rotatably secured to the opposite end of said retainer provided with an aperture adapted to be brought in registry with said grooves by the rotation of said plate.

3. In a multi-cell battery a cell retainer having a plurality of channels arranged about a common center and closed at one end, terminals on the closed end of said retainer each having electric connection with a pair of cell terminals of the same sign, conductors making series connection between cells of different pairs, and a plate rotatably secured to the opposite end of said retainer provided with an aperture adapted to be brought in registry with said channels by the rotation of said plate.

4. In a multi-cell battery a cell retainer having a plurality of compartments therein arranged about a common center and closed at one end, terminals on the closed end of said retainer having electric connection with certain of the cells when contained in said compartments, conductors intercommunicating between the cells contained in said compartments, and a plate rotatably secured to the opposite end of said retainer provided with an aperture adapted to be brought into registry with said compartments by the rotation of said plate.

5. A battery nest comprising a body having a plurality of cell receiving chambers, a fixed closure for one end of said chambers, and a movable closure for the other end of said chambers, said movable closure being rotatably secured to the body and having a cut away portion adapted to be selectively brought in registration with said chambers.

Signed at Chicago, county of Cook and State of Illinois, this 6th day of September 1923.

FRANK T. BAIRD.